June 26, 1962     A. B. MALMQUIST     3,041,222
BOOK COVER MATERIAL
Filed Sept. 4, 1958
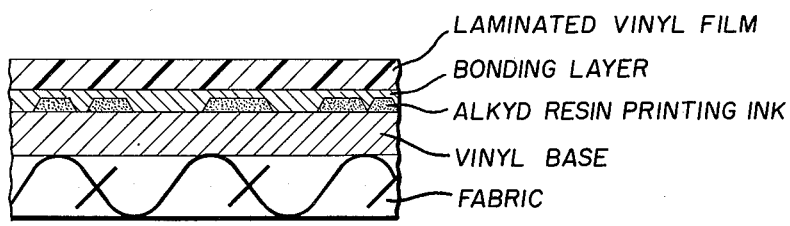
INVENTOR
ALFRED BRUCE MALMQUIST
BY    *P. J. Poindexter*
AGENT 3,041,222
BOOK COVER MATERIAL
Alfred Bruce Malmquist, Stoney Point, N.Y., assignor to
E. I. du Pont de Nemours, and Company, Wilmington,
Del., a corporation of Delaware
Filed Sept. 4, 1958, Ser. No. 758,994
1 Claim. (Cl. 154—52)

This invention pertains to printed plastic sheets, and more particularly to vinyl plastic sheets which are printed with inks in which the principal film former is a drying oil-modified alkyd resin, such as is commonly used in lithography. A specific embodiment of the invention relates to a method of coating a lithographed vinyl bookcover with an adherent and durable film of clear plastic and to the resulting product.

The term "vinyl plastic," or merely "vinyl," as used herein, is intended to designate vinyl chloride polymer compositions. That is, those compositions in which the major resinous ingredient is either polyvinyl chloride, or a copolymer derived from a major amount of vinyl chloride (preferably 80% or more), and a minor amout of another monomer such as vinyl acetate or vinylidene chloride which is reactable therewith to form a useful copolymer. The compositions usually contain modifiers such as, e.g., plasticizers, pigments and stabilizers.

Vinyl plastic sheet materials are known which can be satisfactorily printed lithographically and otherwise, with drying oil-modified alkyd resin inks. These so-called "printable" vinyls are usually made by modifying the vinyl chloride polymer composition with certain plasticizers and/or resins which are capable of overcoming the problems of adhesion and storage stability encountered when printing ordinary plasticized vinyls with drying oil-modified alkyd resin printing inks.

A major deterrent to the unlimited use of lithographed vinyl bookcovers is the unsatisfied need of a protective covering for the decorated surface which yields results in keeping with the superior toughness and durability of the vinyl plastic base.

An embodiment of this invention involves a printable vinyl plastic coated fabric in which up to 100% of the vinyl plastic surface is decorated by printing with a drying oil-modified alkyd resin type ink. A suitable drying oil-modified alkyd resin printing ink useful in practicing this invention is described in U.S. Patent 2,049,507. When the inked surface is dry, there is applied over the printed area and any unprinted area a solution of "Vinylite" VAGH partially hydrolyzed copolymer comprising about 91% vinyl chloride, about 3% vinyl acetate and about 6% vinyl alcohol to form a surface for subsequently adhering a preformed vinyl film. Following the drying of the copolymer resin solution applied over the decorated surface of the vinyl plastic surface, a clear flexible polyvinyl chloride film is superposed thereover and the assembly is laminated with heat and pressure into a flexible unitary composite structure of unusual durability.

"Vinylite" VMCH copolymer, the approximate composition of which is:

|  | Percent by weight |
|---|---|
| Vinyl chloride | 80.0–90.0 |
| Vinyl acetate | 19.7–7.0 |
| Maleic or similar alpha beta olefinic unsaturated carboxylic acid | 0.3–3.0 | is a full equivalent to the "Vinylite" VAGH in the present invention for applying over the printed and unprinted vinyl plastic surface to provide a surface to which a preformed vinyl film can be adhered by means of heat and pressure. The "Vinylite" VMCH resin may be produced in accordance with the teaching in U.S. Patent 2,329,456, issued September 14, 1943, to William E. Campbell, Jr.

The attached drawing is a cross-sectional illustration showing the relation of the various layers with respect to each other in the laminated structure of this invention.

The following examples, wherein the parts and percents are by weight unless otherwise specified, will serve to illustrate the principles and practice of this invention.

*Example 1*

A white vinyl bookcloth receptive to drying oil-modified alkyd resin lithographing inks is produced in the following manner. By means of a doctor knife, a quantity of bleached cotton sheeting weighing 3.7 ounces per sq. yd. is base coated on one side with sufficient of the following composition to deposit about 1.8 ounces of dry coating per square yard:

| Base Coat Composition | Parts by Weight | |
|---|---|---|
|  | Wet | Dry |
| Solution of a partially hydrolyzed copolymer of about 91% vinyl chloride, about 3% vinyl acetate, and about 6% vinyl alcohol, 30% solids in methyl ethyl ketone ("Vinylite" VAGH) | 145.00 | 43.48 |
| Urea-formaldehyde resin, butanol modified, 60% solution in butanol | 21.70 | 13.05 |
| Alkyd resin, drying oil-modified (reaction product of phthalic anhydride and pentaerythritol modified with about 75% of linseed oil by weight of modified resin) | 17.38 | 17.38 |
| Dipropylene glycol dibenzoate ("Flexol" 77G) | 4.36 | 4.36 |
| Titanium dioxide | 19.57 | 19.57 |
| Silica (precipitated from a gel) | 2,16 | 2,16 |
|  | 210.17 | 100.00 |

The butanol modified urea-formaldehyde resin in the above formula is that disclosed in U.S. Patent 2,191,957 and it may be replaced with any of the aliphatic monohydric alcohol modified urea-formaldehyde resins disclosed in U.S. Patent 2,191,957.

A number of sheets of book cover size are cut from the coated fabric material after it has aged for about 15 days. Letters, designs and pictures in various brilliant colors are then printed on the coated side of the sheets with a standard drying oil-modified alkyd resin lithographic ink made in accordance with the disclosure in Example 3 of U.S. Patent 2,049,507. Each printed sheet has from about 30% to 100% of its surface area coated with ink; that is, from 70% to none of the original white coated vinyl surface remains free of ink.

When the ink is dry the printed surfaces of the sheets are coated by means of a conventional transfer roll with a 0.4 mil wet film of a 30% "Vinylite" VAGH solution in methyl ethyl ketone (same as used in the base-coat composition). This coating, which serves as an anchor coat or bonding layer in the laminating step to follow, is thoroughly dried in a heat zone.

A clear preformed flexible film comprising polyvinyl chloride 2 mils thick is placed over the printed surface. In each case the film is laminated to the printed sheet by means of a hydraulic press, the platens of which are heated to about 250° F. A hot pressing cycle of 20 seconds at 50 p.s.i. is followed by a cold pressing sufficient to return the laminate to room temperature.

The surprising durability of the attractive book covers thus produced is demonstrated by the familiar hand scrub test. This severe test, which is a rather reliable measure of how well a book cover material will withstand wear and abuse, is performed by firmly grasping the ends of a 2 inch by 6 inch sample of the product between the thumbs and forefingers and vigorously rubbing the printed surface back and forth upon itself under mild pressure. The scrub resistance is recorded as the number of such back-and-forth rubs required to cause apparent damage to the coating and/or printing.

Unexpectedly, the product of this example has a scrub resistance of about 500 to 550, which is remarkably high in comparison with the 25 to 30 figure obtained with prior art overprint-lacquered bookcovers. There is no cracking of coating or printing, and no sign of delamination. Also, unexpectedly, the printed surface product can be folded to a sharp crease without cracking the dry printing ink.

For all practical purposes, an inseparable bond is formed between the clear polyvinyl chloride film and the printed vinyl sheet. In fact, the bond between the surface film and the printed surface is greater than the bond between the base fabric and base coating composition.

Several books were bound using the product of this example as covers for the binder boards. These books were tested for cover durability under actual use conditions and they were found to have exceptional resistance to edge wear, cracking at the folds, and general abuse. There was no delamination of the layers at the critical hinge area.

An attempt was made to laminate the clear vinyl film to a control sample of the coated and printed sheet material described in Example 1 from which the printing ink anchor coat had been omitted, using the laminating press conditions of that example. After the pressing cycle the film was readily peeled by hand from the printed sheet; hence, in the absence of the anchor coat there was virtually no bond between the surface film and the printed area.

*Example 2*

A stiff preformed film of clear polyvinyl chloride measuring 10 mils in thickness is laminated to the lithographed and anchor-coated sheet material described in Example 1, using a hot pressing cycle of 50 p.s.i. at 260° F. for 30 seconds followed by the usual cooling period.

The somewhat stiff attractively-printed product of this example has excellent resistance to scuffing and wear. It is useful as a decorative door panel insert, and as a luggage covering material.

*Example 3*

An ink-receptive colored vinyl book cover material is prepared by base-coating one side of a bleached cotton sheeting weighing 3.7 ounces per square yard with 2.0 ounces per square yard (dry weight) of the following composition of non-volatile components.

Base coat composition: Parts by weight, dry basis
Polyvinyl chloride _____ 27.1
Tricresyl phosphate _____ 10.4
Liquid polyalpha methylstyrene _____ 7.6
Pigment _____ 51.3
Polyvinyl acetate _____ 3.6
—
100.0

The above composition is prepared by first grinding the plasticizers on a 3 roll mill, then the polyvinyl chloride in powder form is stirred into the resulting mixture at 70° F. Separately, the polyvinyl acetate is dispersed in 36 parts of a solvent mixture consisting of equal amounts of ethyl alcohol and ethyl acetate, after which the two dispersions are thoroughly blended together at 70° F.

The base coat composition containing the volatile components is applied to the base fabric by means of a doctor knife, after which it is passed through a heat zone to expel the volatile solvent.

Next, about 1.8 ounces per square yard (dry weight) of the following intermediate coat composition is doctor-knifed onto the base coat:

| Intermediate Coat Composition | Parts by Weight | |
|---|---|---|
| | Wet | Dry |
| Polyvinyl chloride | 51.4 | 55.0 |
| Tricresyl phosphate | 19.5 | 20.9 |
| Liquid polyalpha methylstyrene | 14.8 | 15.8 |
| Pigment | 7.8 | 8.3 |
| 1:1 mixture of ethyl alcohol and ethyl acetate | 6.5 | |
| | 100.0 | 100.0 |

This composition is prepared in a similar manner to the base coat composition.

The coated sheet is dried in a 260° F. oven; then the oven temperature is raised sufficiently (about 350° F.) to cause the polyvinyl chloride to dissolve in the plasticizers. Cooling completes the preparation of a printable surface.

Colorful fine-detail illustrations are lithographically printed on the coated side of the resulting printable book cover material to cover a substantial portion thereof with ink based on a drying oil-modified alkyd resin. When the ink is dry, the lithographed surface is anchor coated in accordance with the teaching of Example 1, and permanently protected with a film of clear polyvinyl chloride by the lamination method of that example. The product, when properly cut and trimmed, is a durable and attractive book cover.

*Example 4*

A 3.7 ounce per square yard bleached cotton sheeting is doctor-knife coated with 2.0 ounces per square yard (dry weight) of the following composition, which contains volatile solvent when first applied:

Parts by weight
Copolymer of about 85 parts of vinyl chloride and about 15 parts vinyl acetate _____ 17.62
Copolymer of about 95 parts of vinyl chloride and about 5 parts of vinylidene chloride _____ 17.62
Castor oil maleate plasticizer _____ 19.12
Titanium dioxide pigment _____ 45.64

100.00

The copolymers are dissolved in 110 parts of methyl ethyl ketone, and this solution is blended with the product of grinding the pigment in the plasticizer. Drying of the coated fabric is done in an oven.

A high quality book cover is produced by repeating the printing, anchor-coating and laminating steps of Example 1 on the printable sheet material prepared in this example.

*Example 5*

An unsupported vinyl film weighing 5 ounces per square yard is prepared by blending the following ingredients in a Banbury mixer and forming the film on a calender:

Parts by weight
Polyvinyl chloride _____ 34.92
Castor oil maleate _____ 18.56
Titanium dioxide _____ 46.52

100.00

An excellent looseleaf notebook cover is produced by repeating the printing, anchor coating and laminating steps of Example 1 on the resulting film.

The base coated fabric of Example 1 was printed with 100% coverage employing a drying oil-modified alkyd resin printing ink similar to that described in Example 7 of U.S. Patent 2,049,507. Portions of the dry printed surface were coated with the bonding compositions shown in the table below. Following removal of the volatile components of the bonding layers, each portion was laminated to a 12 mil thick preformed film of plasticized polyvinyl chloride by means of simultaneous application of heat (300° F.) and pressure (50 p.s.i.) for a period of 60 minutes. The composition of the bonding layers and bond strengths for each were as follows:

| Bonding Composition | | | Bond Strength of 2" Wide Strip of Preformed Polyvinyl Chloride Film to Printed Surface |
|---|---|---|---|
| Polymer | Dispersing Medium | Concentration of Polymer, percent | |
| "Vinylite" VAGH (See 1 Below). | Methyl Ethyl Ketone | 30 | 14 lbs. |
| "Vinylite" VMCH (See 2 Below). | do | 30 | 12 lbs. |
| "Vinylite" VYHH (See 3 Below). | do | 30 | 2 lbs. |
| "Vinylite" VYNS (See 4 Below). | do | 30 | Too low to measure |
| "Vinylite" VYNW (See 5 Below). | do | 13 | Do. |
| "Geon" 204 (See 6 Below) | do | 25 | Do. |
| "Geon" 101 (See 7 Below) | do | 12 | Do. |
| Polymehtyl Methacrylate | do | 25 | Do. |
| Polyvinyl Acetate | do | 17 | Do. |
| "Geon" 576 (See 8 Below) | Water | 55 | Do. |

1—Partially hydrolyzed copolymer of about 91% vinyl chloride, 3% vinyl acetate and 6% vinyl alcohol.
2—Copolymer of 80–90% of vinyl chloride, 7.0–19.7 of vinyl acetate and 0.3–3.0% of maleic acid or similar alpha beta olefinic unsaturated carboxylic acid.
3—Copolymer of about 85%–90% vinyl chloride and about 15–10% vinyl acetate.
4—Copolymer of about 90%–95% vinyl chloride and about 10–5% vinyl acetate.
5—Copolymer of about 95%–97% vinyl chloride and about 5%–3% vinyl acetate.
6—Copolymer of about 80%–90% vinyl chloride and about 20%–10% vinylidene chloride.
7—Polyvinyl chloride (homopolymer).
8—Plasticized copolymer of vinyl chloride and vinylidene chloride.

The bond strengths were determined in accordance with Method 5950 of Federal Specification, Textile Test Methods, CCC–T–191b, dated May 15, 1951.

The advantages to be gained by th epresent invention, i.e., improved bond strengths of preformed vinyl chloride polymer films to drying oil-modified alkyd resin containing surfaces are readily apparent from the above table.

The advantages to be gained by the present invention, can be polyvinyl chloride (homopolymer), or a copolymer derived from a major amount of vinyl chloride, preferably at least 80%, and a minor amount of another ethylenically unsaturated monomer which is copolymerizable therewith, such as vinyl acetate, vinylidene chloride, ethyl fumarate, diethyl maleate and the like. The vinyl chloride polymer base composition is modified with pigments, plasticizers, stabilizers, etc.

The printable vinyl chloride polymer base layer can be in the form of an unsupported film, or it can be adhered to a flexible or rigid substrate, such as fabric, paper, metal foil, wood or sheet metal. In some applications, it will be desirable to apply a printable vinyl chloride polymer layer on both sides of a substrate.

Other methods than lithography can be used for printing with the drying oil-modified alkyd inks, such as letter press, rotogravure and silk screen techniques. Reverse printing with a simulated wood grain pattern makes possible the production of rich-looking wall and furniture panels.

There is no intention to be limited to any certain minimum of surface area which must be covered by the drying oil-modified alkyd resin printing ink; however, it is expected that the greatest utility of the invention will be realized in those cases where from about 30% up to 100% of the surface of the vinyl chloride polymer base is ink-coated.

The anchor coat which provides the extraordinary adhesion between the printed vinyl chloride polymer base material and the clear protective film is essentially a layer of a partially hydrolyzed copolymer of about 91% vinyl chloride, 3% vinyl acetate and 6% vinyl alcohol or a copolymer of 80–90% vinyl chloride, 19.7–7.0% vinyl acetate and 0.3–3.0% maleic or similar alpha beta olefinic unsaturated carboxylic acid. Only a relatively thin layer of either copolymer is needed, and it can be applied in any convenient manner, preferably in the form of a solution in a volatile organic solvent. While it is usually best to apply the anchor coat to the printed layer, it can be applied instead to the clear polyvinyl chloride film to be laminated thereto.

The polyvinyl chloride film or sheet to be laminated to the printed layer should be clear enough so as not to interfere with the desired appearance of the printing after lamination. The clarity can vary from transparent to translucent, as desired. The film can be thin or thick, limp or stiff. But for bookbinding purposes a limp film of about 1 to 5 mils thick is preferred. The lower limit on film thickness will be governed by such factors as the amount of protection required, ease of handling, and availability of the film. Cost and laminating speed will be limiting factors as thickness increases.

Those skilled in the art of laminating plastic films by means of heat and pressure will have little difficulty in arriving at the optimum press conditions for any particular combination of the printed vinyl materials and clear films in carrying out this invention. Temperatures appreciably above 260° F. and pressures appreciably above 60 p.s.i. are likely to result in excessive flow of the polymers and discoloration of the printing. When pressure rolls are used instead of a flat-platen press, lamination is facilitated by preheating the layers before they pass between the rolls. The gloss and surface texture of the finished product can be controlled by the use of appropriate platen or roller surfaces.

From the foregoing description, it will be seen that the present invention brings about a significant advance in the art of making vinyl bookcovers and other printed vinyl products.

The printed and laminated product of this invention has the remarkable advantage of combining in a single structure the toughness and versatility of printable vinyl chloride polymer sheets and coated fabrics, the unlimited color and fine detail of lithographic printing, and the cleanability and durability of clear polyvinyl chloride film. The thin and flexible bookcloth type of product far surpasses any previously known printed bookcloth in its resistance to damage by flexing, folding and scrubbing. Books covered with this product and subjected to extended use show a surprising lack of edge wear, cracking at the folds, and damage to the hinge and corner areas.

The new and improved approach thus provided for protecting the printing on lithographed bookcloth solves a serious problem which has faced the bookbinding art for many years.

Flexible products produced according to the present invention, in addition to their important utility in bookbinding, are also eminently suitable for maps, wall and furniture coverings, folding doors, case covers and the like. The stiffer products are useful as decorative wall panels, floor covering, and colorful interior trim for buildings and automobiles.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claim as are stated therein, or required by the prior art.

The invention claimed is:

A book cover material comprising:

(a) a fabric base layer, (b) a coating firmly bonded to one side of said base layer comprising—
   (1) copolymer of about 91% vinyl chloride, about 3% vinyl acetate and 6% vinyl alcohol,
   (2) butanol modified urea formaldehyde resin, and
   (3) drying oil modified alkyd resin,
(c) firmly bonded to a portion of the surface of said coating a drying oil modified alkyd resin printing ink,
(d) firmly bonded to said printing ink and said coating a bonding layer consisting essentially of a copolymer selected from the group consisting of
   (1) a partially hydrolyzed copolymer of about 91% vinyl chloride, about 3% vinyl acetate and about 6% vinyl alcohol, and
   (2) a copolymer of about 80–90% vinyl chloride, 7.0–19.7% of vinyl acetate and 0.3–3.0% of an alpha beta olefinic unsaturated carboxylic acid, and
(e) firmly adhered to said bonding layer a clear flexible preformed film of polyvinyl chloride about 2 mils thick.

References Cited in the file of this patent

UNITED STATES PATENTS

| | | |
|---|---|---|
| 2,700,629 | Townsend | Jan. 25, 1955 |
| 2,733,180 | Pinto | Jan. 31, 1956 |
| 2,791,529 | Converse | May 7, 1957 |
| 2,812,277 | Hemming et al. | Nov. 5, 1957 |
| 2,813,052 | Lancaster | Nov. 12, 1957 |

UNITED STATES PATENT OFFICE

CERTIFICATE OF CORRECTION

Patent No. 3,041,222                        June 26, 1962

Alfred Bruce Malmquist

It is hereby certified that error appears in the above numbered patent requiring correction and that the said Letters Patent should read as corrected below.

Column 5, in the table, column 1, line 1 thereof, after "Vinylite" insert a closing quotation mark; column 5, line 48, for "The advantages to be gained by the present invention," read -- The vinyl chloride polymer of the printable base layer --.

Signed and sealed this 16th day of October 1962.

(SEAL)
Attest:

ERNEST W. SWIDER                        DAVID L. LADD
Attesting Officer                         Commissioner of Patents